(12) United States Patent
Ray

(10) Patent No.: US 10,150,026 B2
(45) Date of Patent: *Dec. 11, 2018

(54) PROCESS TO AID IN MOTIVATION OF PERSONAL FITNESS, HEALTH MONITORING AND VALIDATION OF USER

(71) Applicant: EnvisionBody, LLC, Belleair Bluffs, FL (US)

(72) Inventor: Salina Dearing Ray, Belleair Bluffs, FL (US)

(73) Assignee: Envisionbody, LLC, Belleair Bluffs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,949

(22) Filed: Nov. 13, 2017

(65) Prior Publication Data

US 2018/0065026 A1 Mar. 8, 2018

Related U.S. Application Data

(63) Continuation of application No. 15/728,077, filed on Oct. 9, 2017, which is a continuation-in-part of
(Continued)

(51) Int. Cl.
*G09G 5/00* (2006.01)
*A63B 71/06* (2006.01)
(Continued)

(52) U.S. Cl.
CPC .......... *A63B 71/0622* (2013.01); *A63B 22/02* (2013.01); *A63B 24/0006* (2013.01); *G06F 3/011* (2013.01); *G06K 9/00087* (2013.01);
*G06K 9/00288* (2013.01); *G06K 9/00342* (2013.01); *G06K 9/00617* (2013.01);
(Continued)

(58) Field of Classification Search
CPC ........... G06K 9/00288; G06K 9/00342; G06K 9/00617; G06K 9/00087; H04N 7/183; G06T 3/40; A63B 24/0006; A63B 2220/12; A63B 2220/20; A63B 2220/62; A63B 2220/806; A63B 2220/807; A63B 2220/808; A63B 2071/0638; A63B 2071/0647; A63B 2071/0666; G06F 3/011
See application file for complete search history.

(56) References Cited

U.S. PATENT DOCUMENTS 8,976,160 B2  3/2015  Vilcovsky
8,982,110 B2  3/2015  Gray
(Continued)

*Primary Examiner* — Nelson Rosario
*Assistant Examiner* — Andrew Lee
(74) *Attorney, Agent, or Firm* — Ryan O. White; Taft Stettinius & Hollister LLP

(57) ABSTRACT

A method for motivating a user including the steps of providing a device with an image capturing feature; capturing an image of the user with the image capturing feature; modifying the captured image with a processing device to produce a motivational image of the user, the motivational image depicting at least one enhanced feature of the user; and displaying the motivational image from the processing device in substantially real time to the user; wherein the motivational image exclusively depicts a real image of the user having enhanced dimensions for the at least one feature.

4 Claims, 3 Drawing Sheets

Related U.S. Application Data application No. 14/489,349, filed on Sep. 17, 2014, now Pat. No. 9,785,827, which is a continuation-in-part of application No. 13/764,440, filed on Feb. 11, 2013, now abandoned.

(60) Provisional application No. 61/597,702, filed on Feb. 10, 2012.

(51) Int. Cl.
*G06K 9/00* (2006.01)
*H04N 7/18* (2006.01)
*G06T 3/40* (2006.01)
*A63B 22/02* (2006.01)
*A63B 24/00* (2006.01)
*G06F 3/01* (2006.01)

(52) U.S. Cl.
CPC ............... *G06T 3/40* (2013.01); *H04N 7/183* (2013.01); *A63B 2024/0012* (2013.01); *A63B 2071/0638* (2013.01); *A63B 2071/0647* (2013.01); *A63B 2071/0666* (2013.01); *A63B 2220/12* (2013.01); *A63B 2220/20* (2013.01); *A63B 2220/62* (2013.01); *A63B 2220/806* (2013.01); *A63B 2220/807* (2013.01); *A63B 2220/808* (2013.01); *A63B 2225/15* (2013.01); *A63B 2225/50* (2013.01); *A63B 2230/06* (2013.01); *A63B 2230/75* (2013.01)

(56) References Cited

U.S. PATENT DOCUMENTS

| | | | |
|---|---|---|---|
| 2005/0168340 A1* | 8/2005 | Mosher, Jr. ............ | A61B 5/117 340/572.8 |
| 2009/0233769 A1* | 9/2009 | Pryor ..................... | B60K 35/00 482/8 |
| 2013/0120445 A1* | 5/2013 | Shimomura ............ | G06F 3/017 345/629 |

* cited by examiner

PROCESS TO AID IN MOTIVATION OF PERSONAL FITNESS, HEALTH MONITORING AND VALIDATION OF USER

CROSS-REFERENCE TO RELATED APPLICATIONS

This is a continuation application of U.S. patent application Ser. No. 15/728,077, filed Oct. 9, 2017, which is in turn a continuation-in-part (CIP) application of U.S. patent application Ser. No. 14/489,349, filed Sep. 17, 2014, now U.S. Pat. No. 9,785,827, issued on Oct. 10, 2017, and which is in turn a continuation-in-part (CIP) of U.S. patent application Ser. No. 13/764,440, filed on Feb. 11, 2013, now abandoned, and which in turn further claims priority to U.S. provisional patent application Ser. No. 61/597,702, filed on Feb. 10, 2012, now expired. The contents of all of the aforementioned patent applications are hereby incorporated by reference for all purposes as if fully set forth herein.

FIELD OF THE INVENTION

This invention relates to a device process for motivating an individual and/or validating the identity of the individual.

BACKGROUND AND SUMMARY OF THE INVENTION

Obesity is growing faster than any other public health issue in America. If current trends continue, 103 million American adults will be considered obese by 2018. The U.S. is expected to spend $344 billion on health care costs attributable to obesity in 2018. Obesity-related direct expenditures are expected to account for more than 21 percent of the nation's direct health care spending in 2018. Obesity has become an epidemic with no signs of slowing down. Solving this problem starts with motivation and our current methods of motivating people to exercise are obviously not working, particularly as obesity numbers are getting worse.

The problem of lack of motivation to exercise has been partially solved by the implementation of video gaming while exercising. Inventions disclosed in U.S. Pat. No. 7,328,119 to Pryor on Feb. 5, 2008; U.S. Pat. No. 7,693,584 to Pryor on Apr. 6, 2010; and U.S. Pat. No. 8,306,635 to Pryor on Nov. 6, 2012 all address exercise motivation through the use of video gaming, and Pryor compares his invention to an improvement of Nintendo games. A problem with the use of gaming for exercise motivation is that it appeals to a much smaller and younger population, and not to the target age group that most needs to lose weight and that is costing our healthcare industry an exorbitant amount of money.

The target age range that needs to be combated as part of the obesity epidemic is between the ages of 25 to 60. This is the age population that is most overweight or obese. Although using gaming as a means to encourage children and teenagers to exercise may in fact prove to be successful, it fails to solve the problems of low self-esteem and lack of motivation. The present invention is intended to address these problems by not only creating positive emotions in the user, but by also increasing the user's internal dialog and by awakening the user's desire for autonomy and self-determination. University studies show that affecting someone's intrinsic motivation and improving upon their self-efficacy has proven to drastically motivate people to exercise long term, as well as positively affects their diet choices. In addition, the present inventors have found that when a person sees a thinner, more appealing image of himself while exercising, that image remains in his mind long after the completion of his workout, as well as may positively influence post workout food selections while shopping and dining at restaurants. It is believed that a person's food choices will not be improved by gaming alone, nor will the gaming experience enhance the user emotionally or intrinsically. In fact, university studies have suggested that the psychological effect of a positive self-imagery will have a profound effect on a person's motivation to exercise and make better diet choices.

Pryor's inventions claim that the user can see a projected image of himself in the future as a result of his inputted exercise routine and diet plan, for example 30 minutes for 3 times a week and a selected diet plan. However, such inventions fail to motivate the user because they do not provide a real-time image of the user getting thinner and/or more attractive, for example, as the user walks or runs harder and faster on a treadmill. One important factor that the present invention emphasizes is the direct connection between the level of exertion the user exhibits while exercising and the thinner the portrayed self-image the user views in real time during the exercise. Unlike the present invention, Pryor's process does not affect or engage the user in this way while they are exercising. More particularly, Pryor's invention does not include an image of the user improving in relation to the intensity of the exercise then being performed, which, if included, would encourage the user to work harder. Some people simply cannot imagine what a thinner them would look like. By showing them their payoff in advance by displaying a thinner image in real-time while exercising, they are more motivated to exercise much harder and longer than they would otherwise.

U.S. Pat. No. 8,892,219 to Pryor attempts to further address user motivation and rehabilitation regimens through a remote instruction process. However, while the use of instructional exercise programs may be useful in the short term, they fail to solve the problem of self-determination and autonomy within the user, and as a result, they fail to create a positive and long-term diet and/or exercise routine that will benefit the user.

U.S. Pat. No. 7,876,368 to Craig et al. teaches a slimming effect method for digital photographs. Such a system makes no mention of use with real-time video alteration of a scene captured by a camera. Further, such a method makes no mention of modifying certain areas of an image (such as the thickness of a person's upper arms or size of their chin, for example). As such, use of such a system for displaying in real-time a motivational image of an exerciser who is exercising in front of a camera is not possible. Further, such a method does not predict a future, thinner appearance for a person based on their current appearance, a known previous appearance, and a particular combination of diet and exercise plans over a given time.

Pedometers such as FitBit (http://www.fitbit.com), Jawbone (http://jawbone.com), and Runkeeper (www.runkeeper.com) attempt to track the number of steps the user takes in a given period of time. They are intended to assist the user in being aware of the amount of exercise he is getting and by keeping a journal of diet and exercise. However, such devices do not motivate the user to exercise.

While employee wellness programs have proven to help in the battle against weight control and poor health, they still fail to create a synergy between the employee, the employer and the healthcare provider, and as a result, they do nothing to exponentially increase employee participation. The present invention, on the other hand, has significant advantages for personal health care and telemedicine that saves money for the employee, the employer and the healthcare company. Motivation to exercise, validation of the user and biometric testing are now brought together into a single streamlined flow of information to the wellness program manager, physician and personal trainer in a way that was not available previously, but that is greatly needed.

Current wellness programs rely upon swipe cards that the employee uses when entering the gym and/or a pedometer, such as Fitbit or Jawbone, that tracks everyday activity like the number of steps walked, the amount of distance traveled, the number of stairs climbed and the amount of time a person is active. They also track the user's diet, weight and sleep. Another pedometer device, Runkeeper, tracks a user's pace, measures the user's workout distance, charts the user's weight loss and includes a GPS system all within an application running on an iPhone, for example. However, these devices do not provide a solution to the number one cause of obesity, which is lack of motivation to exercise and eat properly.

These prior art devices also can fail to accurately validate the identity of the user. In fact, swipe cards and pedometer devices can be easily manipulated by wellness program participants. For example, a wellness program participant can give his swipe card to a friend who goes to the same fitness center to exercise, thus enabling the inactive wellness program participant to obtain false wellness program credit for exercise performed by another. In a similar fashion, an inactive wellness program participant can easily obtain false exercise credit with pedometer devices by lending them to an active friend who registers a high volume of wellness program credit as compared to the inactive participant. Indeed, many pedometer devices can be shaken by an inactive wellness program participant (or her friend) while sitting on the couch watching television, the end result being additional false program credit for the dishonest participant.

There is undoubtedly a need for a device that unmistakably validates the true identity of the user. With the information disclosed herein, the wellness program participant is able to exercise at a convenient and secure place, such as at home or in a hotel, and at a preferred time while registering true wellness program credit. This would save time and money, especially for the working mother, while simultaneously reducing fuel consumption, traffic and pollution. Most wellness programs provide financial incentives for completion of fitness goals and this validation feature would ensure that the program participants that truly deserve this credit would receive it while the dishonest program participants would not.

By using a portable computing device such as, but not necessarily limited to, a computer tablet, a smartphone, a computer phone, a computer watch, a television, computer and virtual reality glasses, a robot, a voice-controlled intelligent personal assistant services (e.g., Amazon Echo), and the like, the employee can enjoy the convenience and security of completing her exercise in hotel gym to receive her wellness program credit and the benefits of more frequent exercise. All of this information is easily transferred over the internet to a wellness manager or medical advisor as a live feed or stored on a computer or remote server such as a cloud-based server in order to obtain data at any time or location.

In a smart-phone application called Wahoo Fitness (http://www.wahoofitness.com), a body band is used around the chest to gather basic information during exercise, such as tracking of the heart rate, calories burned, distance, and speed. Although this may be informative to the user, it is missing the first step in the process, which is getting someone motivated to exercise. Further, it fails to motivate and engage the user because it falls short in producing a real time thinner and/or more muscular body enhancement image of the user during her workout routine based on the data that is read from the band or validating the user and providing biometric testing.

Facial recognition applications, such as that available at http://www.fst21.com, are used for identifying a person from a previously stored digital image or video frame of that person. Therefore, it is possible to compare the current facial image of a user to a stored facial of that individual to confirm the identity of the user. FST Biometrics, a company that provides secure access systems to various types of buildings and schools, can integrate its application with security and surveillance systems to validate a person's identity before permitting entry by that person. However, this application addresses the security needs of facilities, while the invention described herein solves the critical needs of the healthcare, diet and fitness industries, which are motivation to exercise and validation of the wellness program participant.

The current options to address the need of biometric screening of employees involve either the employee travelling to a medical facility or the use of mobile biometric screening facilities that travel to the workplace. Such prior art solutions are discussed in more detail at http://www.concentra.com/employers/workforce-health-and-well-being/ and http://www.wellnesscorporatesolutions.com. Although the latter method provides a level of convenience and efficiency to the employer and employee, the use of computing devices coupled with various health screening peripherals by employees to perform their own biometric screening at home provides the highest level of convenience, efficiency, privacy and participation in favor of both the employee and the employer. Computing devices such as, but not necessarily limited to, laptops, desktop computers, tablets, smartphones, computer phones, computer watches, televisions, computer and virtual reality glasses, and the like, are able to interface with biometric screening devices used in the home to conduct tests to determine cholesterol levels, blood-glucose levels, blood pressure and the like, and store and transmit that information to physicians and other medical professionals. Indeed, certain test strips that are currently on the market will turn a certain color when a small drop of blood is placed on such a test strip. By scanning this test strip with a cell phone, tablet or laptop camera, the computing device can read these slight color variations on the strips and provide the user with a precise reading of his blood sugar and cholesterol levels. However, the use of such devices at home by the patient, with the current prior art, there is no way to simultaneously confirm the identity of the user as disclosed in the current invention.

Disadvantages that exist in the prior art include disconnection between, for example, the employee needing motivation, the employer needing employee participation, and wellness programs needing to validate the user's identification and biometric testing. Further, there is a disconnection between the medical community and patients with regard to validation of a patient's exercise performance. Poor self-worth and lack of self-esteem that exist with overweight people often fosters a lack of motivation to exercise, which compounds the problem and the exorbitant health care costs in the U.S. Further, diabetes and obesity rates are on the rise, thereby burdening our healthcare system and the economy in U.S. Employers lose time at work from employees due to obesity-related illnesses, and employers' costs to have a wellness program in-house is a further expense.

Therefore, there is a need for a system that can modify in substantially real-time, an image of a user in order to present a motivating image of the user getting thinner, for example. Such a needed system would be able to interface with various exercising machines, and would include an adjustable mount for optimally positioning the electronic device. Further, such a needed device would provide calculations to the user concerning diet and exercise plans needed to achieve a particular estimated appearance within a certain period of time. The present invention accomplishes these objectives.

In accordance with certain aspects herein, the present invention creates a real-time thinner image of the user by using robust image capturing, processing and analysis software in conjunction with a camera on a computing device. The real-time thinner image is then displayed on a screen that the user views while exercising. In accordance with this aspect herein, any computing device can be used, such as, but not necessarily limited to, laptops, desktop computers, tablets, smartphones, computer phones, computer watches, televisions, computer and virtual reality glasses, and the like. The image displayed to the user can be a real-time image, similar to Skype or FaceTime, or it can be shown as a still image instead. In accordance with the present invention, a new and unique outcome of the user's thinner and/or muscular, healthier and more aesthetically pleasing image is achieved by the exercise machine interfacing with the computer device, by body bands interfacing with the computer device, by manual inputs from the user or by the camera on the computer device detecting the user's movement. An electronic skin patch and wearable health monitors such as bracelet or earpiece may also interface with the computer device to create the thinner image. In accordance with still other aspects herein, a foot band is used for extrapolating the current weight and is interfaced with the computer device. According to this embodiment, the band can be used in addition to or rather than the user inputting their weight into the computer device directly. The interface between devices can be achieved through wire or wireless Bluetooth, infrared technology or the like.

While several of the embodiments discussed herein focus primarily on the use of the inventive concept in connection with a treadmill interfacing with an exercise machine to create the thinner image, it should be understood and appreciated herein that the invention is capable of interfacing with any type of exercise machine. For instance, the invention can interface with an exercise bike, an elliptical machine, a stair stepper and the like. Accordingly, the present invention is not intended to be limited herein but is demonstrated in accordance with certain illustrative examples to provide context from a simplistic standpoint. It should also be understood and appreciated herein that the invention can also be used without an exercise machine, such as, while the user is doing floor exercises in front of a computing or electronic device's camera. It can also be used simply to see what the user's thinner and/or more muscular image would look like or for the psychological study of self-imagery or the like. According to certain aspects herein, the user inputs personal data such as gender, age, height and weight and personal measurements. Thereafter, the user inputs a desired weight that they would prefer to reach and the modified real time and enhanced self-image of the user would be displayed accordingly. In accordance with this aspect of the present invention, the image enhancement of the user is achieved by data manually entered by the user into the computing or electronic device in order to see the modified, body enhanced image.

When using an exercise machine such as a treadmill, the action of the interface between the treadmill and the computer causes the user's image to become thinner, healthier and more aesthetically pleasing. Therefore, the faster and/or more intensely the user exercises, the thinner and/or more muscular and more appealing the user's image becomes. In addition to seeing her image, she can also view on the display her exercise data such as heart rate, calories burned and distance advanced. The thinner image can then be transferred in real time while exercising via the internet to someone such as a doctor, wellness manager or the like. Alternatively, a still image of the user's thinner image can be transferred as well. For convenience, at home or in a gym, it is also possible to operate the controls of the exercise machine through the computing device, such as a tablet, in order to move between various exercise machines and have data from the user's exercise routine automatically entered into the computer device such as heart rate, duration and calories burned.

The synergy of the computer/computing device interfacing with the exercise equipment allows the controls of the exercise machine to be accessed directly from the computer device. This allows a convenient method of operating the exercise machines while moving from different exercise machines in a gym or at home. The computer device is able to record the details of the user's workout session. Simultaneously, using the validation and biometric features of the invention, further explained below, allows a complete data report, including proof of the identification of the user or patient, biometrics and exercise report, to be sent via the internet to a health professional or wellness manager. This can be sent via live feed or stored on a computer or cloud based server to be viewed at any time.

Visually seeing the thinner and/or more muscular image can be achieved all in one computer housing or could also be achieved by using a camera on a computing or electronic device to input a user's image and thinner image outputted from the same computer device. In accordance with this illustrative aspect, the outputted image can be projected separately on another area such as a large wall or remote display, thereby allowing a large visual display to be viewed by the user.

It is well known that many overweight people have poor self-esteem and are disappointed with their appearance, which further compounds the individual's lack of motivation to exercise and improve upon their overall health. The purpose of this invention is to improve the users' internal dialog and self-esteem by seeing themselves thinner and more fit in real-time while exercising. This will encourage them to improve their appearance, which in turn will improve upon their health, generate a positive self-image and motivate them to exercise more frequently and more intensely than they otherwise would. For safety, a limit can be set on how thin the image can be displayed to prevent any problems with someone who may suffer from Anorexia or Bulimia.

A further benefit of the present invention is that the real-time thinner and/or more muscular image of the user will remain in his mind, thereby causing him to draw upon his memory of his thinner image when shopping for food, when cooking and when selecting meals at a restaurant. Studies from major universities have proven that improving someone's intrinsic motivation, autonomy and internal dialog has a powerful effect on their diet and exercise habits for the long term.

A further goal of the invention is to provide validation of the user or patient's identity while exercising to further engage and motivate the user to exercise more frequently and for a longer period of time. Current wellness programs, medical treatment plans, exercise personal training schemes and the like, have a strong need for a device or process that will confirm the true identity of the user or patient.

Through a unique interface of the camera and other hardware on the computer device and exercise machine, the user's identification and method of exercise is confirmed during the exercise routine that was not available in the prior art. This can be used on any computer device, such as, but not necessarily limited to, laptops, desktop computers, tablets, smartphones, computer phones, computer watches, televisions, computer and virtual reality glasses, and the like. One illustrative example of using the camera on the computer device to validate the user is to take a still image or short video of the user during their exercise routine. The image taken can be at preset intervals, for instance, every 10 minutes during their exercise routine. Thus, as long as the treadmill is moving, the camera will operate to take their real time image while exercising. If the user stops exercising, the camera will no longer record images. This is used to keep the user engaged and motivated. For example, the user knows if they just push a little longer for 10 more minutes, it will cause the camera to take their image, thereby perhaps obtaining more of a discount on their health insurance costs. Setting a short goal within their exercise routine will motivate the user to exercise longer because such short-term goals are just within reach. This information can be sent to someone in the medical industry or wellness manager to confirm the user's amount of exercise and validating the user's identity. This can be used in combination with GPS to confirm the location, such as a gym location. This information can be sent as a live feed through the use of technology similar to Skype or stored as a still image or video and may be sent at any time.

This user's exercise and identity data is then easily transferred to a wellness manager or doctor over the Internet as a live feed or stored on a computer or remote server such as a cloud based server in order to obtain such data at any time or location. Validation can also be achieved by facial, iris recognition, voice recognition, DNA profile information, and fingerprint scanning.

With the user now having the ability to not only view her improved appearance during the exercise process in real-time, but also now having the simultaneous ability to view her improved biometrics during the exercise process in real-time, a synergy is created that fosters the duel benefits of appearance and health. By displaying to the user or patient the health benefits of her exercise in real-time and by creating a more efficient flow of that data to her wellness program manager, a physician or personal trainer, the user or patient's autonomy, motivation and participation is increased beyond what current technology and fitness programs provide. Notwithstanding the advances in the arts related to the invention disclosed here, there has not been a much needed proposed integrated device the combines validation, motivation and biometric testing in one solution that through proper computer implemented instructions, provides a new robust system with unexpected results that allows a convenient, cost effective method of transferring health data while at the same time validating and motivating the user. This invention benefits the wellness programs and medical industries that desperately need to validate the employee or patient, while also providing significant cost savings that is not otherwise available. This invention has the dual benefit of helping the employee or patient save time and money while boosting participation in their wellness programs and/or medical care.

There is a need to provide a simplified and convenient way of performing biometric screenings by empowering the user to do herself and easily transfer that information to her wellness manager or doctor, thus enhancing the exercise motivation and validation features of the invention, while saving money and fostering self-autonomy. In accordance with certain aspects herein, the biometric testing feature operates along with the validation feature so that the health care professional, or wellness manager, can confirm the user's identity as explained further below.

Therefore, a further goal of the invention is to perform basic biometric testing, such as cholesterol, blood-glucose, blood pressure, current weight and the like using a computer device to further enhance motivation and display the positive progression of a person's health if they stick to an exercise routine. This can be used on any computer device, such as, but not necessarily limited to, laptops, desktop computers, tablets, smartphones, computer phones, computer watches, televisions, computer and virtual reality glasses, and the like. By showing the user their enhanced image for motivation, it is fitting to also have the ability to show them their internal payoffs through the biometric testing feature.

Biometric testing is an important component of a comprehensive health and wellness program. For patients or employees, biometric testing provides important baseline data to shape the direction of their health and/or corporate wellness programs. These screenings provide information on current and potential medical issues. By using this test, users have reliable information about their risk for chronic preventable diseases, such as diabetes, heart disease, and hypertension.

The screenings that are used by current wellness programs are usually performed off site or commonly in a large mobile unit in the employer's parking lot. By the use of the invention, it would save time and money by allowing the employee to test themselves and send the information over the Internet to the wellness manager or medical worker, or to store on a remote server, such as a secure cloud based server, in order to obtain data at any time or location, thereby boosting the user's self-autonomy and participation in the programs.

The present invention also provides a means for closer communication, better care and synergy between the patient and doctor. For example, one can prevent or delay the onset of type-2 diabetes by establishing and monitoring a diet and exercise plan with one's physician. If the spread of type-2 diabetes continues at its present rate, the number of people diagnosed with diabetes in the United States will increase from about 16 million in 2005 to 48 million in 2050. The good news is that type-2 diabetes is largely preventable. About 9 cases in 10 could be avoided by taking several simple steps: keeping weight under control, exercising more and following a healthy diet.

By utilizing the motivation, validation and biometric screening features disclosed here, the patient is motivated to exercise and maintain a goal journal of her workout routine, which a doctor can easily track, and record while monitoring the patient's improved health. Using the validation process of the invention, the patient's identity and exercise routine are confirmed simultaneously. The feature associated with validating the identity of the user may be used while the user is exercising, or alternatively, while the user is not engaged at all in exercising. Perhaps the patient needs to transfer their biometric testing results, diet plan or just a simple question to their health care professional. With the use of the identity validation features, this information can easily be transferred to a doctor for the patient's records and further consultation. When used in this way, the user may not need to engage the body enhancement feature. Current fitness products, such as Fitbit pedometers, fall short in this area because there is no way to confirm the identity of the user or patient and/or to provide a visual motivation stimulant by showing the user an enhanced image of themselves while exercising, nor can such devices provide biometric testing.

All or part of the comprised aggregate data such as the user's identity, duration of exercise, calories burned and heart rate level from his workout as well as the biometric testing performed by the user and validation of the patient, is conveniently transferred to the doctor for the patient's records and further consultation. This creates a closer connection between the doctor and his patient by including the doctor in the patient's fitness program on an ongoing basis.

According to a Harvard study, with tax incentives and grants available under recent federal health care legislation, U.S. companies can use wellness programs to chip away at their enormous health care costs, which are only rising with an aging workforce. It has been proven that healthy employees cost the employer less. Doctors Richard Milani and Carl Lavie demonstrated that point in a study that was published in the Harvard Business Review. The study was conducted using a single employer, using a random sample of 185 workers and their spouses. The participants were not heart patients, but they received cardiac rehabilitation and exercise training. Of those classified as high risk when the study started (according to body fat, blood pressure, anxiety, and other measures), 57% were converted to low-risk status by the end of the six month program. Furthermore, medical claim cost had declined by $1,421 per participant, compared with those from the previous year. A control group showed no such improvements. The bottom line is that every dollar invested in the intervention yielded $6 in health care savings.

Many organizations use online employee Health Reimbursement Arrangement (HRAs) to guide investment surveys and the results from biometric tests such as blood pressure, cholesterol, glucose and body mass index. This information is shared confidentially with each participant to help him or her track wellness progress and, when appropriate, receive company-provided assistance in an area, such as nutrition counseling. Employees can often complete their biometric tests at company health fairs or on-site medical clinics. The current invention will encourage employee participation in the HRAs because of the convenience and ease of use. Furthermore, instead of setting up expensive health fairs or mobile medical clinics in the employer's parking lot, the HRAs save money by having a more efficient way of performing the biometric testing while encouraging employee participation.

It is a goal of this invention to create a synergy between the employee, employer and the wellness program that is missing in the healthcare industry today. This will result in increased employee participation in these programs. Some employees who complete an HRA and receive the recommended health counseling are rewarded by having their personal health insurance contributions substantially reduced. In addition, as mentioned, the employer and health insurance companies save money as well if the employee will participate.

As an example, participation is enhanced because the employee can use the invention at home on her TV, with electronic or virtual reality glasses, with a robot or a voice-controlled intelligent personal assistant service (such as Amazon Echo), or with any other type of computer device, in order to save the time and money associated with going to the gym and possibly having to pay for childcare. Many wellness programs provide a discount to the employee on her health insurance costs for participating in the program as mentioned previously. She now is better able to achieve the requirements of her wellness program, which helps her obtain the discount on her health insurance without leaving home. This added benefit will motivate more employees to participate in company wellness programs because of the ease and convenience provided by this invention. In addition, the validation feature allows her to confirm her identity as well. There is a need for the unique features of this invention that solve the problem intrinsic in today's wellness programs by validating the identity of the user and the exercise performed which cannot be accomplished with the use of a swipe card at the gym or a pedometer due to the ease of providing those devices to a friend who will record erroneous exercise data for the defrauding employee to use to obtain discounts and other company benefits.

When using the invention through a computing device, such as, but not necessarily limited to, a computer tablet, a smartphone, a computer watch, a computer phone, or the like in a hotel exercise room, the employee can easily meet his exercise goals when traveling. When in use, the camera can automatically redact any background images for privacy reasons. If the user does not want or need to use that particular validation feature, then he can simple turn it off. It should be understood and appreciated herein that in addition to a portable computer device or other such portable electronic device, the present invention can be used with any type of electronic device, whether or not that device is easily portable or not. For instance, in accordance with certain aspects herein, the invention can be used with a television (TV), a robot or a voice-controlled intelligent personal assistant service (such as Amazon Echo), or other such electronic device that is capable of displaying an image. Accordingly, the present invention is not intended to be limited herein.

This invention can also be easily and affordably merged into a fitness manufacture's current control and entertainment panel screen on their exercise machines. Precor, for example, is one of the top fitness manufactures and is making the connection with their own network fitness capability with their Preva Network program. Preva Network gives facilities the option of enabling web browser capability so users can access their favorite websites during their workout and track their exercise routine. The program also allows owners of the gyms to track the use of each machine remotely.

Although this system is entertaining for the user, it is lacking in motivation by not allowing the user to see themselves thinner or more muscular the harder they exercise, confirming the ID validation, and biometrics read if desired from one system. Also, there is no way of using their current program to send this aggregated information over the internet as previously explained. This is a great connection and works nicely together with the wellness programs and the exercise manufactures that give users new and unexpected results that they currently do not have.

The present invention is designed to create synergy and enhance employee/patient participation because of the ease and convenience of its use. Furthermore, wellness programs will operate more efficiently because of the invention's validation feature, which is missing today, and because of the user's ability to perform her own biometric testing.

Employers will benefit from the invention by virtue of its employee's increased participation in exercise and diet programs, which will increase productivity in the workplace and reduce the healthcare costs that is so desperately needed. Indeed, the negative impact of stress related illnesses such as depression and anxiety will be significantly reduced which in turn reduces the incidence of divorce and violence in the workplace. Indeed, the benefits of this much needed invention when utilized to its fullest are boundless.

In accordance with certain aspects herein, a weight measurement of the exercise may be taken from a stretch resistance band that has a sensor inside the band. In accordance with this embodiment, the band is worn by a user by placing the stretch resistance foot band sensor under around the foot of the user; calculating the user's weight based on small button size scales with a diameter of approximately ⅓ in., that are included inside of the foot band. Bands are interfaced with the computer and wirelessly by Bluetooth technology or the like, thereby allowing the foot band to automatically sync with the computer, and as a result, providing the user with their current weight and automatically sending the information to the computer device.

Interfacing between the exercise machine and the computer device by means of a code, it is now possible for to operation of the exercise machine to be controlled by a computer device. For an example, if using a tablet connected directly by USB port or another form of hardwire directly to the exercise machine, it is possible to control the exercise machine directly on the tablet or through Bluetooth technology. The controls of the exercise machine operate through the tablet such as—in the case of a treadmill—speed of the treadmill, elevation and duration. This can also work wirelessly through a code that is read by the computer device outputted from the exercise machine. The exercise data from the user's workout routine on the exercise machine such as speed, duration and calories burned are automatically entered into the computer device from the exercise machine.

The user may input into the electronic device personal data such as gender, age, height and weight and personal measurements. Then the user inputs the weight that they would prefer to be and a thinner or more muscular image will be displayed accordingly. The image thinning of the user is achieved by data manually entered by the user into the computer device in order to see their thinner image. This is either or both a real-time video or a still image of the user.

When using an exercise machine such as a treadmill, the action of the interface between the treadmill and the computer causes the user's real time video image to become thinner, healthier and more aesthetically pleasing. If interfacing with a weight bar or dumbbells, the user is able to see their enhanced, more muscular image. The faster and/or more intensely the user exercises, the thinner or more muscular and more appealing the user's image becomes. In addition to seeing her image, she can also view on the computer screen, or other such display monitor, her exercise data, such as heart rate, calories burned and distance advanced.

Visually seeing the enhanced image can be achieved all in one computer device or can also be achieved by using a camera on a computer device to input the user's image and enhanced image outputted from the same computer device, but projected separately on another device, such as a large flat-screen monitor or projected image on a wall, rather than the computer screen.

Through an interactive electronic adhesive skin patch worn on the skin, or through a wearable health monitor and/or exercise monitoring devices, such as a bracelet or earpiece that uses an analysis layer and input/output interface, the ability is created to read the user's data while exercising, such as heart rate and breathing rate. Through computer-implemented instructions, the computer reads the increased heart and breathing rate from the health monitor devices or electronic skin patch and based on those readings, the identity validation feature is activated and/or the body enhanced image is created. This can be achieved by wire connection or wirelessly. As such, the interface between the electronic skin patch, wearable health monitor and/or exercise-monitoring device allows the identity verification of the user to be activated and/or to see a motivation enhanced body image of themselves.

With the use of MEMS technology and bio-MEMS combined with micro-systems and nano-systems, physiological sensors, wearable health monitor devices with physiological sensors that are worn inside the ear of the user, bracelets or electronic skin patches are able to capture at least the heart rate and breathing rate, such data being transmitted to the computer device while exercising. As long as the computer device is reading the heart rate and breathing rate information from the earpiece, the image of the user will become thinner or more muscular accordingly.

Body band devices such as arm, neck, stomach, head, leg and foot bands are another method of obtaining measurements, weight, heart rate, oxygen level, number of steps taken, and distance data from a stretch resistance sensor inside the bands worn by a user engaging in exercise. This can include placing one of the resistance sensor around the user's foot that is able to take the user's weight based on small button size scales that are a diameter of approximately ⅓ in., and that are fixed with the foot band. Bands are interfaced with the electronic device wirelessly by Bluetooth technology or the like. Input from such devices is automatically synchronized by the computer device, and through a suitable computer-implemented instruction set, this data from the body bands may then be used to calculate and display an approximation of the user's thinner or more muscular image based on current exercise levels and the other data received. As long as the bands are getting a reading of current measurements and/or steps currently taken and increased heart rate, oxygen level and steps taken, the enhanced body image will appear and/or a validation of the user's identity takes place, thereby motivating the user to press on with the exercise routine. Once data stops being read from the body bands, the image goes back to normal size on the screen if using this feature and/or validation of the user's identity will stop working. Weight of the user can also be taken from the treadmill if the treadmill is outfitted with a weight scale function.

Therefore, it is an object of this invention to contribute to the user's sense of self-worth and self-esteem. It is a further object to provide a method of intrinsic motivation by using real time thinning or more muscular self-imagery, and to create a long lasting self-image impression that will enhance healthy food selections. It is also an object to provide biometric testing that enhances the user's exercise experience and engages the user's self-autonomy, as well as to narrow the gap between intention and action for the user by providing motivation to exercise and to participate in prescribed health programs. The present invention is also intended to bridge the separation of the employee, employer and the healthcare company or the medical industry in a useful, resourceful, streamline manner that will increase employee participation, as well as to connect the gap that exist between the patient and the medical industry in a useful, resourceful way that will encourage patient care participation. The present invention is further intended to provide accessibility and to enhance the capabilities of the wellness programs, as well as to save money for the employee, employer and the healthcare industry. Moreover, the present invention is also configured to provide accessibility and to enhance the capabilities of the patient's control of their medical care, as well as to save money for medical costs, and to provide a program that can be used on an electronic device to encourage use while traveling. In addition, the present invention is also intended to provide a program that can be used in the convenience of a home environment, as well as to lessen the loss of productivity from sick time taken, including less depression and stress, which have been proven to be in particular sources of loss of productivity. Finally, the present invention is intended to enhance participation in a wellness or diet program, thereby reducing the growth of diabetes in the U.S., as well as reducing health care cost in the U.S.

According to certain aspects herein, the present invention is uniquely designed to address two costly and prevalent problems, lack of motivation to exercise and difficulties validating the identity of the exerciser. For instance, in certain embodiments, the invention is adapted to increase motivation in the user by providing a real time thinner and/or more muscular image of the user while exercising. In accordance with this embodiment, the user can see themselves thinner and/or more muscular, as if looking into a mirror. This is not an animated image of the user, but the actual person looking at themselves, only thinner and/or more muscular, in real time as they exercise. Although this feature can operate independently in accordance with certain embodiments, it should be understood and appreciated herein that the process also has the ability to interface with exercise equipment or wearable tracking devices. In accordance with these embodiments, the more exertion the user exhibits while exercising, the thinner their image will become as a result.

In accordance with one embodiment, the present invention is configured to interface with exercise equipment so that the when the equipment moves, a camera or other such image capturing device is caused to take an image of the user or require a fingerprint of the user periodically to verify the identity of the user. It should be understood and appreciated herein that the image taken of the user can be either a live (real-time) video image or a still (static) image. Moreover, in accordance with certain aspects herein a Bluetooth connection can be established between the exercise equipment and the camera/image capturing device so that the device is prompted to take an image when the user or exercise equipment is in motion or electronic device may make a beeping sound, or other such notification method, to notify the user that they have to input their fingerprint.

According to certain aspects herein, the inventive system can be configured such that the faster the exercise equipment and/or user is moving, the more drastically the captured image can be modified. For instance, the image of the user can become thinner or more muscular as the detected movement increases in speed.

In accordance with still other embodiments of the present invention, health or exercise-tracking devices, such as a Fitbit, a chest band or other such tracking device, can be programmed to cause the camera/image capturing device to take an image of the user as movement is detected. Moreover, in accordance with yet other embodiments, the health or exercise-tracking device can prompt the user to press their finger against the device to scan for fingerprint recognition purposes and/or to prompt the user to speak for purposes of voice recognition in order to validate the user's identity. According to certain aspects herein, this feature may occur using two separate devices, such as a health or exercise-tracking device and a computer or television, computer phone, computer or virtual reality glasses. Alternatively, this feature may function automatically if the health or exercise-tracking device and computer device is comprised in one unit, such as a computer watch. In this case, it may have the ability to read heart rhythm for validating the identity of the user or provide a fingerprint impression. Moreover, and in accordance with certain embodiments, the camera/image capturing device can be configured to take an image when the heart rate of the user reaches a threshold level. Alternatively, the health and/or exercise-tracking device can be configured to cause the camera/image capturing device or other such validation device to take an image and/or to verify the identity of the user at periodic intervals. It should be understood and appreciated herein that the periodic intervals can be uniform in nature (e.g., every 5 or 10 minutes, for instance) or randomized if desired. Accordingly, the present invention is not intended to be limited herein.

According to yet another aspect of the present invention, an image can be taken and/or modified on-demand according to certain embodiments. For instance, according to certain aspects herein, the system can be configured to recognize when an individual presses a button, or other similar input device—and as a result of recognizing the activation of such device, will automatically take a real-time image of the user and/or modify a captured image of the user on-demand. It should be understood and appreciated herein that in accordance with this exemplary embodiment, the on-demand activity is not dependent upon whether or not the user is exercising at the time the input device is activated. As such, the present invention is intended to be useful for activities and situations outside of the exercise arena—for instance, in weight loss settings and/or for cosmetic or bariatric surgery purposes, etc. In accordance with these exemplary embodiments, the present invention can be utilized as a motivational tool to show a patient what their body would look like if enhanced as desired—and such enhancement could be performed in real-time even when the user is not exercising.

According to yet other exemplary embodiments herein, the present invention can be configured to modify a captured image of the user in a more immersive way through augmented reality principles, such as by using "Holoportation" software from Microsoft. As those of skill in the art will understand and appreciate herein, this technology allows the user to see, hear, and interact with other users remotely as if both are present in the same physical space. To accomplish this, 3D cameras are programmed to capture and record a user's movements and then construct a temporally consistent 3D model that is capable of compressing and sending the associated data out to anywhere in the world. Alternatively, if the user choices not to interact with others, the hololens tracking system that is attached to a 3D camera, allows the body enhancement modification to occur in real-time and the user would have the option not to send to a remote location. An enhanced body composition of the user can be created in real-time in the real world in front of the user; powerfully affecting the user's intrinsic motivation. The augmented reality principals can also be applied with the use of electronic glasses, such as Google Glass or Vuzix M3000. Moreover, as these interactions are recordable, they can be replayed and manipulated (such as by shrinking) if desired, thereby giving users the sense of reliving that moment in real-time.

In accordance with certain aspects in which the automatic and on-demand capturing or modification of an image is desired, the inventive system can also be programmed to validate the identity of the user when the input device or button is activated. Of course, it should be understood and appreciated herein that various different combinations of these on-demand features can be activated or disabled depending on the desired circumstance. For instance, it is envisioned that under certain circumstances, it may desirable to conduct an on-demand validation of a user without the further need to conduct a modification of the image. Accordingly, the body modification feature can be disabled as necessary depending on the situation in which the inventive system is being employed.

In accordance with still other aspects of the present invention, the system is also uniquely designed to validate the user's identification or identity while exercising. More particularly, as the use of wearable tracking devices, such as Fitbit has become the norm for employees to track their employees' activity levels as part of various incentivized wellness programs, the need to validate the authenticity of such activities has become essential. For instance, without proper validation, a user can easily manipulate and misconstrue their activity levels and associated tracking data. Using devices that have not been properly validated can lead to fraudulent claims being submitting by employees—a problem which will ultimately cost employers significant financial losses. The present invention is intended to minimize and/or eliminate these problems by properly validating the user's identity as part of the tracked exercise.

According to certain aspects herein, the present invention is configured to validate the actual exercise performed by the user by using a camera or other such device. In addition, the present invention is also adapted, in accordance with certain embodiments, to perform biometric testing (such as blood sugar and blood pressure measurements) via Bluetooth synchronization to common third party devices, as well as is configured to provide a diet, exercise plan and goal journal to the user if desired.

In accordance with certain aspects herein, the present invention is configured to create a diet and exercise plan according to the data entered by the user. According to this aspect, the plan is stored in a journal, and the software tracks the user's workout results against their diet and exercise plan and encourages them to increase their workout and/or modify their diet. Moreover, in still other embodiments, the software is configured to provide a healthy diet plan that has been established by a registered dietary nutritionist to assist them in their weight loss goal, as well as a personal journal to track the diet plan.

According to certain aspects herein, the present invention may also be offered in coordination with a mobile application or other such web service. For instance, the software may be adapted to display a savings amount and/or a health point total, as determined by data entered by the user such as the user's height, weight, age, gender, measurements, desired weight, and health plan information corresponding to health plan rates based on the user's parameters. Moreover, the system may also display health plan points or dollars saved on a screen while the user is exercising. Of course, it should be understood and appreciated herein that the user does not have to be exercising to access this information, whereby in accordance with certain embodiments, the user can access this information through a mobile application or other such web service at any time as desired. In addition, in accordance with still other embodiments, the present invention is further adapted to display estimated health statistics of the user based upon the user's desired weight and the user's blood glucose level, heart rate and blood pressure on the screen as the user is exercising.

According to one illustrative aspect herein, a method for monitoring an exerciser is provided. In accordance with this aspect of the invention, the method comprises the steps of: detecting movement of the exerciser using a device with a video camera; capturing an image of the moving exerciser with the video camera; transmitting the captured image to an identity verification device; comparing biometric data from the image to a biometric profile provided by the exerciser; collecting exercise data from the exerciser if the biometric data matches the biometric profile; generating a motivational image of the exerciser with a processing device, the motivational image being produced from an acquired image of the exerciser, the acquired image depicting at least one feature; and displaying the motivational image from the processing device in substantially real time while the exerciser is in motion; wherein the motivational image depicts a real image of the exerciser having enhanced dimensions for the at least one feature.

In accordance with certain aspects herein, the step of comparing biometric data comprises comparing the biometric data f with the identity verification device.

In accordance with still other aspects herein, the captured image of the exerciser is a still image of the exerciser, while in accordance with still other aspects, the captured image is a live video image of the exerciser. Moreover, in accordance with certain aspects herein, the captured image of the exerciser can be an image or scan of the exerciser's fingerprint—and once the fingerprint image/scan is captured by the imaging device, it can then be used for purposes of validating the identity of the exerciser. Alternatively, the captured image of the exerciser, in accordance with still other embodiments, can be an image or scan of the exerciser's eye/iris—and once the image or scan is captured by the imaging device, the captured image can then be used for purposes of validating the identity of the exerciser, for instance, by utilizing facial recognition software or the like.

According to yet further aspects of the present invention, the steps of detecting, capturing, comparing, collecting and transmitting are performed more than once during the exercise session, for instance, at scheduled intervals during the exercise session or at random intervals during the exercise session.

In accordance with certain embodiments herein, exercise data specific to the exerciser or user is stored on a remote server, and the biometric profile of the exerciser or user may include data related to their physical dimensions.

According to still other aspects of the present invention, the method may further comprise transmitting exercise data to a third party if the compared biometric data matches the biometric profile of the exerciser or user.

According to certain aspects herein, the present invention further includes the step of generating the motivational image of the user or exerciser in response to the on-demand activation of an input device.

In accordance with still other embodiments herein, the step of comparing biometric data from the image to the biometric profile comprises comparing the biometric data to the biometric profile in response to the on-demand activation of an input device.

According to one embodiment herein, a method for motivating a user is provided comprising the steps of providing a device with an image capturing feature; capturing an image of the user with the image capturing feature; transmitting the captured image to an identity verification device; comparing biometric data from the image to a biometric profile provided by the user; generating a motivational image of the user with a processing device, the motivational image being produced from an acquired image of the user, the acquired image depicting at least one feature of the user; and displaying the motivational image from the processing device in substantially real time to the user; wherein the motivational image exclusively depicts a real image of the user having enhanced dimensions for the at least one feature.

In accordance with still other aspects herein, the present invention further comprises the step of detecting movement of the user prior to capturing the image with the device, while in accordance with additional embodiments, the method further comprises activating an input device on-demand prior to capturing the image of the user with the device.

According to certain aspects herein, the step of comparing biometric data from the image to a biometric profile comprises verifying the identity of the user.

In accordance with yet other embodiments herein, the present invention further comprises collecting data from the user if the identity of the user is verified upon comparing the biometric data to the biometric profile. The collected data, in accordance with certain aspects herein, may be further stored on a remote server and/or transmitted a third party (such as a medical provider or wellness coordinator) if the compared biometric data matches the biometric profile of the user.

It should be understood and appreciated herein that the biometric profile of the user can include any type of personal and/or health care information of the user; however, in accordance with certain aspects herein, the biometric profile includes data related to physical dimensions of the user.

According to yet another embodiment of the present invention, an electronic device is provided. The electronic device, in accordance with this embodiment, comprises: an imaging device structured to capture an image of a user; a memory device structured to store input data of the user; a network communicator structured to transmit and receive communication signals; an identity verification device structured to receive the input data from the network communicator and to validate an identity of the user based on analyzing the captured image against the input data; a processing device in electronic communication with the network communicator structured to: receive identification data from the identity verification device, receive an acquired image of at least one feature of the user, receive the stored input data from the memory device, estimate an enhanced appearance of the at least one feature of the user based on input data including the acquired image and the stored input data, and create a motivational image of the user, the motivational image exclusively depicting a real time and modified image of the acquired image of the at least one feature; and an output display structured to display the motivational image from the processing device in substantially real time.

According to certain embodiments herein, the identity verification device includes at least one of a camera structured to capture an image of the user, a microphone structured to receive sound data from the user, a barcode scanner, an iris scanner structured to capture data from the user, a fingerprint scanner, a biometric scanner, a heart rate monitor, a facial recognition system, and DNA information.

According to still other embodiments herein, the output display is configured to display at least one of health care information, health plan points or dollars saved and health statistics specific to the user.

In accordance with still other exemplary embodiments, the electronic device further comprises a device configured to detect movement of the at least one feature prior to capturing the image, wherein the device is structured to cause the image to be captured in response to the detected movement.

According to other embodiments, the electronic device further comprises an input device configured to cause the imaging device to capture the image in response to the on-demand activation of the input device.

In accordance with yet other embodiments, the electronic device further comprises an input device that is configured to cause the identity verification device to validate the identity of the user in response to the on-demand activation of the input device.

In accordance with yet another embodiment of the present invention, a method for motivating a user comprises the steps of: providing a device with an image capturing feature; capturing an image of the user with the image capturing feature; modifying the captured image with a processing device to produce a motivational image of the user, the motivational image depicting at least one enhanced feature of the user; and displaying the motivational image from the processing device in substantially real time to the user; wherein the motivational image exclusively depicts a real image of the user having enhanced dimensions for the at least one feature.

According to certain aspects herein the method for motivating a user further comprises the step of activating an input device on-demand prior to capturing the image of the user with the device.

In accordance with still other embodiments of the present invention, the step of modifying the captured image comprises activating an input device on-demand to cause the processing device to produce the motivational image. In addition, and in accordance with certain aspects herein, the captured image of the user is a still image or a live video image of the user.

According to still another embodiment of the present invention, a method for monitoring an exerciser is provided. In accordance with this embodiment, the method comprises the steps of: associating a motion tracking device with the exerciser; detecting movement of the exerciser with the motion tracking device during an exercise session; periodically prompting the exerciser during the exercise session to provide a biometric data feature to an identity verification module associated with the tracking device, the biometric data feature being selected from at least one of an image, a sound cue, a motion cue, a barcode, a body scan and a DNA specimen; processing the biometric data feature with the identity verification module by comparing the biometric data feature to a stored biometric profile of the exerciser; and collecting exercise data from the exerciser if the biometric data feature matches the biometric profile.

In accordance with certain embodiments herein, the identity verification module includes at least one of a camera, a microphone, a barcode scanner, an iris or retinal scanner, a fingerprint scanner, a motion detector, a heart rate monitor, a facial recognition system, and a DNA analysis feature.

In yet other embodiments of the present invention, the image of the exerciser is a still image or a live video image of the exerciser.

In accordance with certain embodiments of the present invention, the steps of detecting, prompting, processing and collecting are performed more than once during an exercise session, while in accordance with still other embodiments, the steps are performed at scheduled or random intervals during the exercise session.

According to certain aspects, the step of collecting exercise data from the exerciser is structured to automatically stop collecting data during the exercise session if the exerciser fails to provide a biometric data feature to the identity verification module when prompted. Moreover, in accordance with some embodiments, the exercise data is stored within a memory device, wherein the memory device is configured to be stored locally within the tracking device or remotely on a server.

In another aspect of the present invention, the biometric profile includes data related to physical dimensions of the exerciser. Moreover, the exercise data, in accordance with certain aspects, can be transmitted to a third party if the compared biometric data feature matches the biometric profile of the exerciser.

According to another embodiment, the step of processing the biometric data feature with the identity verification module comprises comparing the biometric data feature to the biometric profile in response to the on-demand activation of an input device.

In accordance with yet other aspects of the present invention, a method for validating the identity of a user is provided. According to this aspect, the method comprises the steps of: providing an identity verification device having an image capturing feature, the identity verification device including at least one of a camera structured to capture an image of the user, a microphone structured to receive sound data from the user, a barcode scanner, an iris scanner structured to capture data from the user, a fingerprint scanner, a biometric scanner, a heart rate monitor, a facial recognition system, and a DNA analysis feature; capturing an image of the user with the image capturing feature; comparing biometric data from the captured image to a biometric profile provided by the user, the biometric profile being stored in a memory device in communication with the identity verification device; and transmitting identity verification data to a third party if the compared biometric data matches the biometric profile of the user.

According to certain aspects herein, the captured image of the user is a still image or a live video image of the exerciser, and the identity verification data is transmitted to a remote server.

In certain embodiments herein, the biometric profile includes data related to physical dimensions of the user, and the step of comparing the biometric data from the image to the biometric profile comprises comparing the biometric data to the biometric profile in response to the on-demand activation of an input device.

According to still another embodiment herein, a method for validating the identity of a user is contemplated and comprises the steps of: providing a health tracking device that is associated with the user, the health tracking device being configured to record health related information of the user; prompting the user to submit biometric data to an identity verification module in communication with the health tracking device, wherein the biometric data is selected from at least one of an image, a sound cue, a motion cue, a barcode, a body scan and a DNA specimen; verifying the identity of the user by comparing the submitted biometric data to a stored biometric profile of the user; transmitting the recorded health related information to a third party if the identity of the user is positively verified; conducting a health screening analysis of the transmitted information; and generating a health screening report from the analysis, the health screening report including a customized wellness plan for the user.

According to certain aspects herein, the identity verification module includes at least one of a camera, a microphone, a barcode scanner, an iris or retinal scanner, a fingerprint scanner, a motion detector, a heart rate monitor, a facial recognition system, and a DNA analysis feature.

According to still other embodiments, the validation method further comprises capturing an image of the user with an image capturing device in communication with the identity verification module.

In accordance with still other embodiments, the validation method further comprises producing a motivational image of the user by modifying the captured image with a processing device, the motivational image depicting at least one enhanced feature of the user.

According to still another embodiment, the validation method further comprises displaying the motivational image from the processing device in substantially real time to the user, wherein the motivational image exclusively depicts a real image of the user having enhanced dimensions for the at least one feature.

Other features and advantages of the present invention will become apparent from the following more detailed description, taken in conjunction with the accompanying drawings, which illustrate, by way of example, the principles of the invention.

DETAILED DESCRIPTION

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
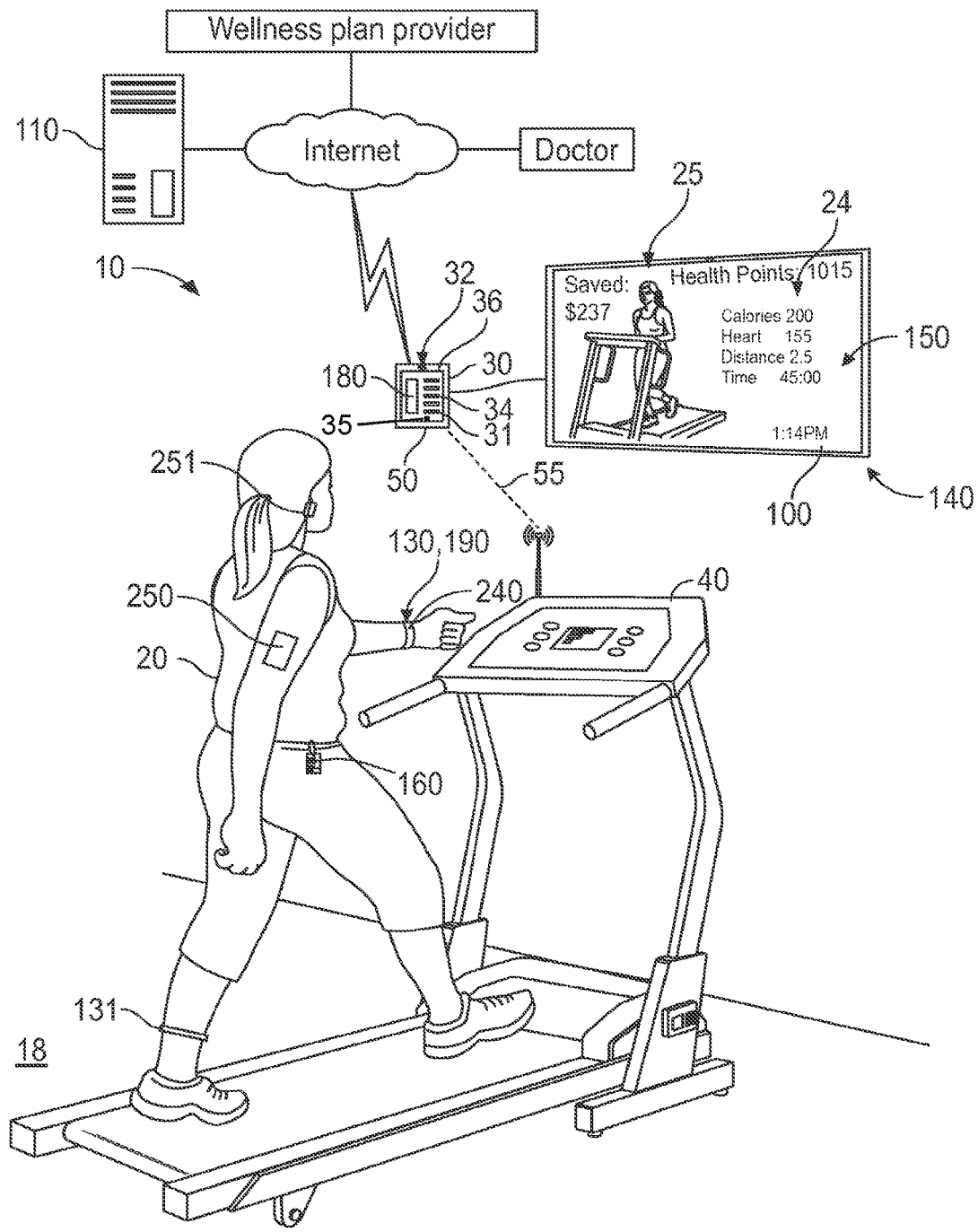
FIG. 1 is a perspective view of one embodiment of the invention.
Figure 2:
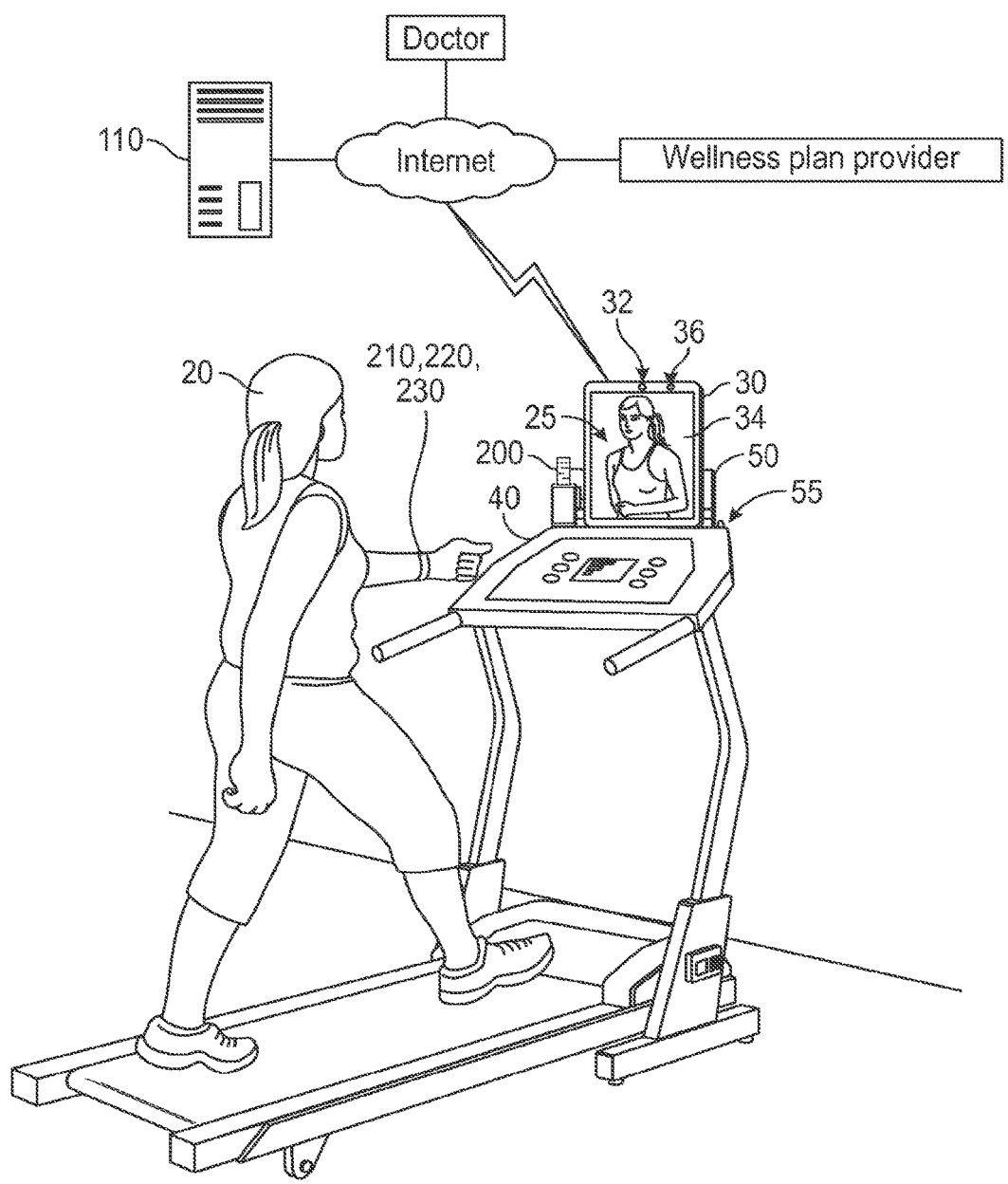
FIG. 2 is a perspective view of an alternate embodiment of the invention.
Figure 3:
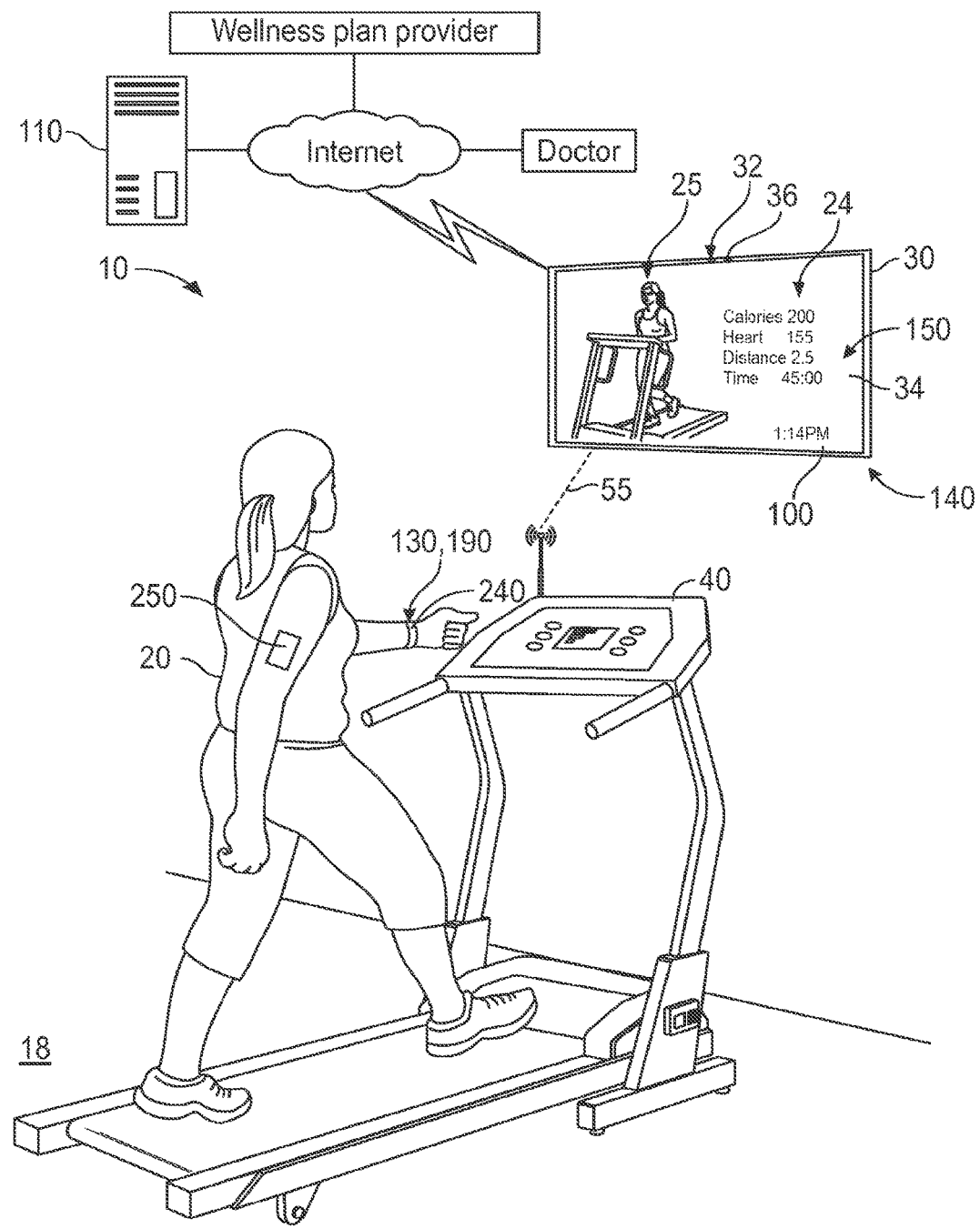
FIG. 3 is a perspective view of another alternate embodiment of the invention.

FIGS. 1 and 2 illustrate a system 10 for aiding a user 20 performing an exercise in an exercise area 18 utilizing an electronic device 30. The electronic device 30 is of the type that includes at least a non-volatile storage medium 31, a camera 32, a display 34, a button/input device 35, a microphone 36 and at least periodic access to the Internet or other large area network. Such an electronic device may be a wall-mounted television, cell phone, computer or virtual reality glasses, tablet computer, laptop or desktop computer, or the like.

An adjustable mount 50 secures the electronic device 30 in such a way as to orient the camera 32 of the electronic device 30 towards the user 20 in the exercise area 18. The mount 50 includes a mechanism for securing to the electronic device 30 and for securing to a wall, exercise machine 40, or the like.

A server 110 with access to the Internet is further included and is adapted to receive information from the electronic device 30, which can then be sent to the user's doctor, wellness program, or other authorized practitioner. Such information may include user identity validation information from the electronic device 30, as further explained below, as well as data from the exercise machine 40, biometrics, motivational image statistics, and image and modified motivational image 25 data from the electronic device 30, and data from alternate validation systems, dollar amounts saved, health points earned, and other data, as further explained below.

A set of computer-implemented instructions resident in the non-volatile storage medium 31 of the electronic device 30 is adapted to cause the camera 32 to record a still or video image or produce a live feed of the patient or exercising user 20 when movement is detected by the camera 32. Further, the electronic device 30 is instructed to use an identity validation system 130 to validate the identity of the user 20 performing the exercise, and to transmit to the server 110 at least the user's identity as determined by the identity validation system 130 and the time 140 and duration 150 of the exercise performed by the user 20.

In accordance with certain embodiments herein, the system can be configured to recognize when an individual presses a button, or other similar input device 35, and as a result of recognizing the activation of such device 35, will automatically take a real-time image of the user and/or modify a captured image of the user on-demand. It should be understood and appreciated herein that in accordance with this exemplary embodiment, the on-demand activity is not dependent upon whether or not the user is exercising at the time the input device is activated. As such, the present invention is intended to be useful for activities and situations outside of the exercise arena—for instance, in weight loss settings and/or for cosmetic or bariatric surgery purposes, etc. In accordance with these exemplary embodiments, the present invention can be utilized as a motivational tool to show a patient what their body would look like if enhanced as desired—and such enhancement could be performed in real-time even when the user is not exercising. It should also be understood and appreciated herein that while the input device 35 is illustratively shown on the electronic device 30, the input device 35 could alternatively be implemented into any other device in communication with the system 10. For instance, the input device could be incorporated into any electronic or health tracking device utilized by the user, such as, but not limited to, a smartphone, a tablet, a laptop, a desktop computer, a watch, a body band, an electronic skin patch, an earpiece, a bracelet or other such electronic device that is capable of communicating with the system 10 through Bluetooth or other such technology. Additionally, the input device 35 could be incorporated into an electronic device maintained by a third party, such as an employer or health care provider. In accordance with these illustrative embodiments, for instance, the third party could activate the input device 35 on-demand from the same or a remote location in order to verify the identity of the user, capture an image of the user and/or prompt the system to create a modified/enhanced image of the user in real-time.

In one embodiment, wherein the exercise area already includes the exercise machine 40 that is adapted for transmitting exercise data 24 to an interface 55 thereof, the electronic device 30 is further adapted to receive the exercise data 24 from the exercise machine 40 and then transmit the exercise data 24 to the server 110. Additionally, the electronic device 30, as directed by the instructions therein, may prompt the user 20 for additional health data 24, such as height, weight, gender, age, blood pressure, average heart rate, desired weight, desired blood pressure, desired average heart rate, and the like.

The health data 24 may additionally include an image of a blood test strip, such as a blood cholesterol or glucose test strip 200, blood pressure data of the user 20 as determined by a blood pressure monitor 210 in the exercise area 18, heart rate data of the user 20 as determined by a heart rate monitor 220 in the exercise area 18, blood oxygen concentration data of the user 20 as determined by a blood oxygen monitor 230 in the exercise area 18, and the like.

Preferably the electronic device 30 is further adapted, through the set of instructions, to display a motivational image 25 on the display 34 of the electronic device 30 in accordance to the speed or duration of the detection of movement of the user 20 by the camera 32. Such a motivational image 25 relates to the shape of the user 20 as detected by the camera 32 of the electronic device 30, and is preferably a thinner representation of the user 20. Such a motivational image 25 may further be determined by the shape of the user 20 as detected by the camera 32 of the electronic device 30 and in accordance to the exercise data 24 of the exercise machine 40. The thinner motivational image 25 may also be determined in part by parameters entered by the user 20, provided by health tracking devices such as a body band 230, electronic skin patch 250, earpiece 251 or bracelet, and other exercise data 24. The motivational image 25 may be a real-time image displayed to the user 20, or a live feed image broadcast to a remote location.

The thinner motivational image 25 may be further transferred to the server 110 for use in motivational emails, or the like. A separate display 34, such as a flat-panel display or television, may be interfaced with the electronic device 30 (FIG. 1) to display the image 25 and exercise data 24.

Validation of the user's identity during exercising may be achieved through any of the following: 1) the exercise machine 40 indicates movement thereof at the interface 55 with the electronic device 30, resulting in the set of instructions causing the camera 32 to periodically take a photo and send it to the server 110; 2) movement is sensed by the camera 32 (such as the user's shoulders moving up and down), resulting in the set of instructions causing the camera 32 to periodically take a photo; 3) a DNA validator electronic skin patch 250, electronic bracelet 130, or an electronic earpiece 251 reads a DNA signature from the user 20; 4) the camera 32 of the electronic device 30 enables facial recognition routines included in the set of instructions to identify the user 20; 5) a barcode ID (not shown) of the user, such as is found on a government-issued ID for example, is scanned by camera 32; 6) voice recognition is performed by the electronic device 30 through use of the microphone 36; 7) an image of the user's iris is scanned and compared to a previously-validated image thereof; 8) a fingerprint scanner 180 is utilized to scan the fingerprint of the user 20; or the like. It is understood that as additional identity verification systems and devices become available that the present invention may be adapted to accommodate such new technologies without changing the spirit or scope of the invention.

The camera 32 may take a still image or real time video of the user 20 according to output parameters of the exercise machine 40 transmitted by wire, wirelessly by Bluetooth technology, infrared communication, or the like. The image can be captured at pre-set intervals. For example, as long as the exercise data 24 is being produced by the exercise machine 40, the camera 32 can be instructed to capture the user's image every 10 minutes. Therefore, as long as the user 20 continues exercising, the camera 32 will continue to capture the user's image. For privacy, background images may be automatically obscured, if desired. Additionally, upon the camera 32 sensing movement of user 20 (such as shoulder movement up and down of the user 20) on an exercise machine 40, or within the exercise area 18, the camera 32 can be set to capture the user's image at the pre-set intervals.

With the use of MEMS technology and bio-MEMS combined with micro-systems and nano-systems, a DNA validator 190 such as an electronic skin patches 250 or wearable health monitors in the form of a bracelet 130 or electronic earpieces 251 can provide a DNA signature of the user 20. Thus, wearing these devices 190 that are interfaced with the electronic device 30, either by wire or wirelessly, provides validation of the user's identity.

A facial recognition routine may be used for automatically identifying and verifying a user from a digital image or a video frame. The image taken is matched to one single image in a database. For example, an image taken of a user is compared to all of the images that are stored in a database (not shown), resulting in the single best match that is in the database.

To further help validate the identity of the user 20, the bar code 160 associated with an ID card, such as a driver's license, is scanned by the camera 32 and is then compared to a known bar code 160 associated with the user 20. This can be achieved by simply implementing a bar code 160 that is located on a government ID, or a newly issued swipe card that is coded with the user's identification information. The camera 32 on the electronic device 30 reads the bar code 160 and identifies the user 20.

In order to create a base line vocal pattern for speech recognition identity validation, a speech sample of the positively identified user 20 is segmented and dominant frequencies called formants are determined. The segments are then digitized into a biometric template. Thereafter, when authenticating a user's voice, the previous voice basis in the database is compared to the current voice that is being identified by matching an assigned questions or phrase. Voice identification is quickly and accurately captured by the microphone 36 and processed by the electronic device 30 or a remote voice identification server (not shown).

Through the computer-implemented instructions and by utilizing the camera 32 on the electronic device 30, user iris recognition may also be used as an automated method of biometric identification that uses mathematical pattern-recognition techniques on video images of the iris of the user's eyes. The complex, random patterns of a person's iris are unique and can be seen from some distance. The unique pattern that is being authenticated is then compared to others in a database, thus allowing the user's identity to be confirmed.

Through suitable computer implemented instructions, impressions of fingerprints of the user 20 are placed on the smooth surface of the display 34 of the electronic device 30 display. By the use of natural secretions of sweat from the eccrine glands that are present in friction ridge skin a unique fingerprint is captured from the user. Through proper computer implemented instructions, the electronic device 30 is able to read the fingerprint and properly identify the user 20. This can be achieved by capturing the fingerprint of just one figure, such as the thumb, or the whole hand, as desired based on the size of the electronic device 30. Alternately, a separate fingerprint scanner 180 within the exercise area 18 may be used.

With the use of test strips 200 that take a small drop of blood, the camera 32 on the computer device is able to read slight changes on the strip 200; allowing determination of the reading to be given to the user 20 and associated healthcare workers. Alternately, by implementing algorithms such as what is used with OneTouch® Verio® Sync for example, a separate meter device automatically sends the user's blood sugar results wirelessly to the electronic device 30. By utilizing the camera 32 to sense small changes in facial color based on blood flow such as the Vital Signs Camera App by Phillips, heart and respiratory rates can be obtained. Blood volume pulse propagates throughout the body. During the cardiac cycle, volumetric changes in the facial blood vessels modify the path length of the incident ambient light such that subsequent changes in amount of reflected light indicate the timing of cardiovascular events.

Body band devices 240, such as arm, neck, stomach, head, leg band 131 and foot bands are another means of obtaining measurements, weight, heart rate, pulse rate and the like. By utilizing small button-size scales that are approximately ⅓ inch in diameter and located inside of the stretch resistant foot band, weight of the user 20 is obtained by placing the band around the foot and standing on it. Blood pressure, pulse and heart rate can easily be read from such band devices 240 wirelessly using Bluetooth technology or the like. However, separate blood pressure monitors and blood glucose meters can also be connected to the electronic device 30 directly as well through the use of a USB port or the like.

With the use of MEMS technology and bio-MEMS combined with micro-systems and nano-systems, physiological sensors are used in electronic skin patches 250 or electronic earpieces 251 to provide an accurate reading for blood pressure, body temperature, bone density, pulse, heart rate, cholesterol and blood oxygen percentage, and such can be read wirelessly using Bluetooth technology or the like. Thus, wearing these convenient devices 240,250 that are interfaced with the electronic device 30 provides real time biometric data 24 of the user 20.

The user 20 may enter her employer's wellness or weight loss requirement program, or details of a point system of the user's diet and health plan, into the electronic device 30. This aggregated information is then compared to her current exercise routine that the user 20 is performing and her points or dollars saved are displayed on the display 34 in front of her as she is exercising (FIG. 1). The harder and longer the user 20 exercises, the higher her points or dollars reach in real time on the display 34. As such, this increases motivation for her to keep exercising for a longer period of time. This can be used in conjunction with the thinner image 25 of her or by itself to help motivate the user 20.

The user 20 may further input her current weight, measurements, age, gender, cholesterol, body fat, blood pressure and/or blood sugar into the electronic device 30, as opposed to when using the biometric devices 240, 250 described above wherein some of this information is read directly from the electronic device 30 via wireless networking instead of being received as input from the user 20. Once the thinner image 25 is calculated using the aforementioned methods and inputs, whether directly from the user into the computer device or wirelessly from wearable devices such as the electronic skin patch 250, earpiece 251, bracelet 130 or body band 131, the system 10 can calculate what the user's stats would be if they weighed as much as the thinner image displayed, and such information is displayed on the display 34 accordingly. The thinner image 25 of the user 20 that is displayed also is displayed with an estimate of what the user's weight, measurements, cholesterol, body fat, blood pressure and blood sugar would be if the user 20 was indeed as thin as the thinner image 25 that is displayed, thereby motivating the user 20 to exercise with more intensity and for a longer duration than he might normally.

Another goal of the invention is the generation of data to study the effects of positive self-imagery or the like. For example, the data obtained from the present system can be used to study the effects of self-imagery, motivation and autonomy, for the study of bulimia and anorexia, or for the study of positive feedback during exercise or sports activities.

In one embodiment, the motivational image 25 is a thinner representation of the user 20 as determined by data received from an electronic skin patch 250, earpiece 251, bracelet 130, and/or body band 131 (FIG. 1).

In the set of computer-implemented instructions is further adapted to display a savings amount and/or a health point's total, as determined by entered parameters about the user 20, including the parameters of the user's height, weight, age, gender, measurements, desired weight, and health plan information corresponding to health plan rates based on the user's parameters. Further, the set of computer-implemented instructions may be adapted to display estimated health statistics of the user 20 based on the user's desired weight, such health statistics including blood glucose level, heart rate, and blood pressure.

While a particular form of the invention has been illustrated and described, it will be apparent that various modifications can be made without departing from the spirit and scope of the invention. For example, the system may be adapted to be used for a group of people, such as a yoga or exercise class. Alternately, the system may be adapted for use by people who are not exercising on an exercising machine. For example, mental health patients might use the system to assist in positive self-imagery such as a smile, self-esteem and autonomy exercises. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. In addition, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The invention claimed is:

1. A method for motivating a user comprising:
   providing a device with an image capturing feature;
   capturing an image of the user with the image capturing feature;
   modifying the captured image with a processing device to produce a motivational image of the user, the motivational image being derived solely from data obtained from the captured image and depicting a thinner and/or more muscular version of the captured image of the user; and
   displaying the motivational image from the processing device in substantially real time to the user;
   wherein the motivational image exclusively depicts a real image that is a thinner and/or more muscular version of the captured image of the user.

2. The method of claim 1, further comprising activating an input device on-demand prior to capturing the image of the user with the device.

3. The method of claim 1, wherein the step of modifying the captured image comprises activating an input device on-demand to cause the processing device to produce the motivational image.

4. The method of claim 1, wherein the captured image of the user is a still image or a live video image of the user.

* * * * *